(12) United States Patent
Utima et al.

(10) Patent No.: US 10,017,633 B2
(45) Date of Patent: Jul. 10, 2018

(54) METHOD OF MEASURING VISCOSITY OF GUMS

(71) Applicant: COLGATE-PALMOLIVE COMPANY, New York, NY (US)

(72) Inventors: Enzo T. Utima, Sao Paulo (BR); Erico V. Prat, Sao Paulo (BR); Shashank Vishwanath Potnis, Thane (IN); Shridhara M. Kamath, Mumbai (IN); Amit U. Sirdesai, Mumbai (IN); Rupali J. Madhavi, Mumbai (IN); Santosh V. Vartak, Mumbai (IN); Rolando Plata, Mumbai (IN)

(73) Assignee: Colgate-Palmolive Company, New York, NY (US)

( * ) Notice: Subject to any disclaimer, the term of this patent is extended or adjusted under 35 U.S.C. 154(b) by 0 days.

(21) Appl. No.: 15/101,918

(22) PCT Filed: Dec. 5, 2014

(86) PCT No.: PCT/US2014/068753
§ 371 (c)(1),
(2) Date: Jun. 5, 2016

(87) PCT Pub. No.: WO2015/085151
PCT Pub. Date: Jun. 11, 2015

(65) Prior Publication Data
US 2016/0312013 A1    Oct. 27, 2016

(30) Foreign Application Priority Data
Dec. 5, 2013 (IN) .......................... 3528/DEL/2013

(51) Int. Cl.
*C08L 5/00* (2006.01)
*C08L 1/28* (2006.01)

(52) U.S. Cl.
CPC ............... *C08L 5/00* (2013.01); *C08L 1/286* (2013.01)

(58) Field of Classification Search
None
See application file for complete search history.

(56) References Cited

U.S. PATENT DOCUMENTS

| 3,934,000 A * | 1/1976 | Barth ....................... A61K 8/25 |
| | | 424/49 |
| 2003/0003059 A1* | 1/2003 | Dana ..................... A61K 8/986 |
| | | 424/49 |
| 2004/0063927 A1* | 4/2004 | Tsai ........................ A61K 8/73 |
| | | 536/54 |
| 2004/0185027 A1* | 9/2004 | Reierson .................. A61K 8/55 |
| | | 424/70.23 |
| 2010/0183697 A1 | 7/2010 | Swanick et al. |
| 2011/0274811 A1 | 11/2011 | Hines et al. |

OTHER PUBLICATIONS

Francis, Solution Properties of Water-Soluble Polymers. I. Control of Aggregation of Sodium Carboxymethylcellulose (CMC) by Choice of Solvent and/or Electrolyte, J. Applied Polymer Science, V(15), 1961, 261-270.

International Search Report and the Written Opinion of the International Searching Authority issued in International Patent Application PCT/US2014/068753 dated Apr. 8, 2015.

Sato, Evaluation of Additives Required for Periodontal Disease Formulation Using Basic Fibroblast Growth Factor, Chem. Pharm. Bull. 58 (12), 2010, 1582-1586.

* cited by examiner

*Primary Examiner* — Daniel S Larkin

(57) ABSTRACT

A method of determining the viability of a gum for use in making a product has been achieved by (a) mixing a sample of the gum in a solvent comprising one or more hydroxy moiety containing solvent compound to form a solution with the gum; (b) measuring the viscosity of the solution and comparing against a predetermined target viscosity for a product; and (c) comparing the viscosity of the solution and the predetermined target viscosity and discarding gum which is outside the predetermined target viscosity; and (d) using the gum which has a viscosity within the predetermined target to prepare a product; wherein another hydroxy moiety containing solvent is used if water is used as a solvent. Also described are compositions comprising the gum and solvent comprising one or more hydroxy moiety.

20 Claims, No Drawings

METHOD OF MEASURING VISCOSITY OF GUMS

CROSS-REFERENCE TO RELATED PATENT APPLICATIONS

This application is a U.S. national stage application under 35 U.S.C. § 371 of PCT Application No. PCT/US2014/068753, filed Dec. 5, 2014 and claims the benefit of priority of Indian Patent Application No. 3528/DEL/2013 filed Dec. 5, 2013, the entireties of which are incorporated herein by reference.

BACKGROUND

Gums (also known as hydrocolloids) are well known thickening agents, gelling agents and binding agents and have also been used as emulsifiers, foaming or whipping agents, encapsulating agents, film forming agents, flocculating or clarifying agents and crystallization inhibitors. See *Carbohydrates in Food*, ed. Ann-Chariotte Eliasson, pg. 285 (1996); see also *Food Chemistry*, ed. Owen Fennema, pg. 186-190 (1996).

Given their widespread utility, the gums are often consumed in vast quantities in industry. A problem associated with the use of gums is how to quickly ascertain a bad lot or batch of gum material provided by a bulk manufacturer of gums. Far too often, the unsuitability of the gum material is not detected until after the final product has been produced.

Complicating this problem is that feedstock for gums from natural origin are often the source of attribution to account for different viscosity patterns for gums received from different suppliers. Moreover, in order to obtain specific viscosity properties for their gums, suppliers often rely on proprietary mixing techniques to form their products.

Given the stringent regulatory laws and rules governing pharmaceutical and food compositions, it would be beneficial to detect any potential problems with a gum purchased from a supplier as early in the process of making a product as possible.

The comparison of viscosities are especially critical when using different suppliers or changing suppliers of the thickener or emulsion stabilizer compounds.

A common method of testing a gum sample is the use of gel permeation chromatography (GPC) with or without a size exclusion chromatography (SEC) system. A test sample is injected into the chromatographic system and the properties of the gum are determined via a detector system comprised of one or more of a refractive index detector and a viscometer.

The viscometric data generated can form a Mark-Houwink plot, the curvature of which can provide information about properties of the tested gum material, However, the GPC/SEC system, in addition to being time consuming, suffers from needing expensive and sensitive equipment more suited for the small scale, controlled environment of a university laboratory rather the rigorous conditions of a factory floor.

Other methods for determining viscosity and the homogeneity of a gum include a theological method (creep and recovery test) and the use of NIR (near infrared) spectroscopy.

The creep and recovery test, a sample reacts to constant shear stress for a certain period of time by deforming ("creep"). The sample is then relieved of the shear stress so that it can recover. See ASTM-D2990 (creep test); ASTM-D2991 (stress relaxation test)

However, this method also suffers from the problems of requiring high-cost test equipment (rheometer) and being a lengthy test process when measuring the time from sample preparation to final analysis of the tested sample.

The use of NIR spectroscopy also requires high-cost test equipment and its accuracy in determining viscosity, and therefore, the homogeneity of the gum, is uncertain.

Water has also been used with gums for the purposes of viscosity assessment by forming a slurry, dispersion or solution of the gum in water. However, this form of the gum often leads to incomplete dispersion or solubilization of the gum in water and to the formation of lumps which skews the viscosity measurements.

In addition, formation of such slurries, dispersion or solutions in water may require 24-48 hours for the gum to swell and impart its optimum viscosity.

Therefore, a need still exists in the art to quickly and accurately determine the viability of using a gum.

BRIEF SUMMARY

A method of determining the viability of a gum for use in making a product has been achieved by (a) mixing a sample of the gum in a solvent comprising one or more hydroxy moiety containing solvent compound to form a solution containing the gum; (b) measuring the viscosity of the solution and comparing against a predetermined target viscosity for a product; and (c) comparing the viscosity of the solution and the predetermined target viscosity and discarding gum which is outside the predetermined target viscosity; and (d) using the gum which has a viscosity within the predetermined target to prepare a product; wherein another hydroxy moiety containing solvent is used if water is used as a solvent.

Also described are compositions comprising the gum and solvent comprising one or more hydroxy moiety.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION

The following description of the preferred embodiment(s) is merely exemplary in nature and is in no way intended to limit the invention, its application, or uses.

As used throughout, ranges are used as shorthand for describing each and every value that is within the range. Any value within the range can be selected as the terminus of the range.

In addition, all references cited herein are hereby incorporated by referenced in their entireties. In the event of a conflict in a definition in the present disclosure and that of a cited reference, the present disclosure controls.

Unless otherwise specified, all percentages and amounts expressed herein and elsewhere in the specification should be understood to refer to percentages by weight. The amounts given are based on the active weight of the material.

One embodiment of the invention is directed toward a method of determining the viability of a thickener or emulsion stabilizer compound lot for use in making an oral care product which comprises:

(a) mixing a sample of the gum in a solvent comprising one or more hydroxy moiety containing solvent compound to form a solution containing the gum;
(b) measuring the viscosity of the solution and comparing against a predetermined target viscosity for a product; and
(c) comparing the viscosity of the solution and the predetermined target viscosity and discarding gum which is outside the predetermined target viscosity; and
(d) using the gum which has a viscosity within the predetermined target to prepare a product; wherein another hydroxy moiety containing solvent is used if water is used as a solvent.

One of ordinary skill in the art would be able to ascertain what constitutes the predetermined target viscosity based on their knowledge of the product that is intended to be produced.

The predetermined viscosity is determined by preparing a solution containing the thickening or emulsion stabilizer compound and measuring the solution in a viscometer. The measurement is repeated and the average of the first and second measurement is recorded as the final result.

If the final results is an unacceptable standard for establishing a predetermined viscosity suitable for the compound lot to be used in an oral care product, the amount of: (1) water and polyhydric alcohol or polyethylene glycol; or (2) thickening or emulsion stabilizer compound can be adjusted until a suitable predetermined viscosity is achieved.

In one embodiment of the method, the concentration of the gum in step (a) is 1-60% by weight, based on the weight of the solution and the gum is selected from the group consisting of modified celluloses, seed galactomannans, microbial polysaccharides, seaweed extracts/sulfated, galactans, seaweed extracts/poly(uronic) acid, citrus peel extracts/poly(uronic) acid, exudate gums, starch, agar, collagen, egg whites, furcellaran, gelatin, casein and mixtures thereof.

In another embodiment of the method, the concentration of the gum in step (a) is 2-50% by weight, based on the weight of the solution and the gum is selected from the group consisting of carboxymethylcellulose, methylcellulose, hydroxypropylmethylcellulose, microcrystalline cellulose, guar gum, locust bean gum, xanthan gum, carrageenan, alginates, pectins, gum arabic, starch, agar, collagen, egg whites, furcellaran, gelatin, casein and mixtures thereof.

In one embodiment of the method, the gum is a carboxymethylcellulose or a carrageenan.

In one embodiment of the method, the solvent containing one or more a solvent comprising one or more hydroxy moiety is selected from the group consisting of a polyhydric alcohol, a monohydric alcohol, polyethylene glycol, polypropylene glycol, water and mixtures thereof.

The polyhydric alcohols include, b it are not limited to, glycol, glycerol (glycerin), propylene glycol, ethylene glycol, erythritol, threitol, arabitol, xylitol, ribitol, mannitol, sorbitol, galactitol, fucitol, iditol, inositol and mixtures thereof.

The monohydric alcohols include, but are not limited to, alkyl alcohols (e.g., methanol, ethanol, propanol, butanol (all forms), pentanol (all forms), etc.), stearyl alcohols, fatty alcohols (e.g. a $C_{12}$-$C_{22}$ fatty alcohol) and mixtures thereof.

Polyethylene glycol has the chemical formula $H-(O-CH_2CH_2-)_nOH$ and polypropylene glycol has the chemical formula $H-(O-CH(CH_3)CH_2-)_nOH$. These alcohols include, but are not limited to glycols wherein n is selected from a range consisting of 2-2000, 10-5000, 20-2000, 200-1000 and 400-800.

In one embodiment of the invention, the solvent is a mixture of one or more of the specific polyhydric alcohols, monohydric alcohols, polyethylene glycols, polypropylene glycols described above and water.

In one embodiment of the method the solvent is selected from the group consisting of polyethylene glycol wherein n is 200-1000, glycerin, water and mixtures thereof.

In one embodiment of the method, the solvent comprising one or more hydroxy moiety containing solvent compound is water and a polyhydric alcohol and the ratio of water to polyhydric alcohol is from 2:1 to 1:2.

In one embodiment of the method, the solvent comprising one or more hydroxy moiety containing solvent compound is water and a polyhydric alcohol and the ratio of water to polyhydric alcohol is from 4:3 to 3:4.

In one embodiment of the method, the solution has a concentration selected from the group consisting of 10-50 wt. %, 25-45 wt. %, 1-6 wt. %, 2.5-4.5 wt. % and 3-4 wt. % of the gum.

In one embodiment of the method, the solvent is water and the polyhydric alcohol glycerin.

In one embodiment of the method, the solvent is polyethylene glycol where n is 400-800.

In one embodiment of the method, the gum is first mixed with the polyhydric alcohol to form an intermediate compound/alcohol solution and subsequently, the intermediate compound/alcohol solution is mixed with water to form the solution containing the gum.

In one embodiment of the method, the predetermined target viscosity is between 50,000 and 200,000 cP after testing a solution containing 1.5-6 wt. % of the gum between 30 minutes and 90 minutes after formation of the solution.

In one embodiment of the method, the predetermined target viscosity is between 100,000 and 200,000 cP after testing a solution containing 4 wt. % of the gum between 50 minutes and 70 minutes after formation of the solution or between 50,000 and 75,000 cP after testing a solution containing 3 wt. % of the gum between 50 minutes and 70 minutes after formation of the solution.

In one embodiment of the method, the predetermined target viscosity is between 225,000 and 600,000 cP after testing a solution containing 1.5-6 wt. % of the gum between 18 hours and 30 hours after formation of the solution, In one embodiment of the method, the predetermined target viscosity is between 450,000 and 600,000 cP after testing a solution containing 4 wt. % of the gum between 22 hours and 26 hours after formation of the solution or between 225,000 and 300,000 cP after testing a solution containing 3 wt. % of the gum between 22 hours and 26 hours after formation of the solution, In another embodiment of the method, the gum is used if the viscosity measurement is within a range selected from the group consisting of ±35%, ±30% and ±25% of the predetermined target viscosity after the initial measurement.

In one embodiment of the method, the product is selected from the group consisting of oral care product, a home care product, a personal care product, a pharmaceutical product, a food product, a lubricant product, a paint product, a detergent product, a textile sizing product and a paper product.

In one embodiment of the method, the oral care product is a toothpaste, mouthwash, mouthrinse, dental floss and strips.

Another embodiment of the invention is a solution consisting of a gum and a solvent comprising one or more hydroxy moiety containing solvent compound to form a solution containing the gum wherein the solution has a concentration selected from the group consisting of 1-60 wt.

%, 2-50 wt. %, 10-50 wt. %, 25-45 wt. %, 1-6 wt. %, 2.5-4.5 wt. % and 3-4 wt. % of the gum wherein another hydroxy moiety containing solvent compound if water is present.

In one embodiment of the solution, the gum is selected from the group consisting of selected from the group consisting of modified celluloses, seed galactomannans, microbial polysaccharides, seaweed extracts/sulfated galactans, seaweed extracts/poly(uronic) acid, citrus peel extracts/poly(uronic) acid, exudate gums, starch, agar, collagen, egg whites, furcellaran, gelatin, casein and mixtures thereof and the the solvent comprising one or more hydroxy moiety containing solvent compound is selected from the group consisting of a polyhydric alcohol, a monohydric alcohol, polyethylene glycol, polypropylene glycol, water and mixtures thereof.

In one embodiment of the solution, the gum is selected from the group consisting of carboxymethylcellulose, methylcellulose, hydroxypropylmethylcellulose, microcrystalline cellulose, guar gum, locust bean gum, xanthan gum, carrageenan, alginates, pectins, gum arabic, starch, agar, collagen, egg whites, furcellaran, gelatin, casein and mixtures thereof, and the solvent comprising one or more hydroxy moiety containing solvent compound is selected from the group consisting of glycol, glycerol (glycerin), propylene glycol, ethylene glycol, erythritol, threitol, arabitol, xylitol, ribitol, mannitol, sorbitol, galactitol, fucitol, iditol, inositol, methanol, ethanol, propanol, butanol, pentanol, stearyl alcohols, a $C_{12}$-$C_{22}$ fatty alcohol, a polyethylene glycol or polypropylene glycol where n is selected from a range consisting of 2-6000, 50-3000, 100-2000, 200-1000, and 400-800 and water, wherein another hydroxy moiety containing solvent compound if water is present. At high MW, the polypropylene glycol is melted into liquid form before mixing with the gum.

In another embodiment of the solution, (a) the gum is carboxymethylcellulose and the solvent is water and glycerin; or
(b) the gum is carboxymethylcellulose or carrageenan and the solvent is a polyethylene Embodiments of the present invention are further described in the following examples. The examples are merely illustrative and do not in any way limit the scope of the invention as described and claimed.

EXAMPLES

Example 1

Preparation of 3% CMC Sample Solution in Water and Glycerin

Equipment—Viscometer: Brookfield Model RVDV-II+ equipped with Helipath Stand and T-Bar Spindle T-C; Overhead Stirrer: IKA Model Eurostar power control—vise equipped with two-bladed centrifugal stirrer or four bladed propeller stirrer.

In a 600 mL beaker, 242.50 g of glycerin (A) was weighed. In a separate container, 242.50 g of water (B) was weighed. In a separate container, 15.00 g sample of sodium CMC (C) was weighed. Using the overhead stirrer, glycerin (A) was agitated at 1000 rpm. Sodium CMC (C) was added to the glycerin (A) under agitation at 1000 rpm and allowed to mix for 5 minutes. Water (B) is added to the mixture of (A)+(B) under agitation at 1000 rpm. The mixing speed is then raised to 2000 rpm and the agitation of the mixture of (A)+(B)+(C) continues for 15 minutes. The container containing the mixture of (A)+(B)+(C) is covered with plastic film and placed in a 25° C. temperature controlled environment until further use.

Example 2

Measurement of Viscosity After 1 Hour and 24 Hours

One hour after the preparation of the 3% CMC sample solution of Example 1, the viscometer is set to spindle type S93 (T-C), a 1 minute stop time and a speed of 2 rpm. The spindle (T-C) is inserted in to the 3% CMC sample solution using the disengaging lever of the Helipath stand.

The spindle shaft is entirely immersed in the test sample and the reversing rod of the helipath is fully pressed down. The helipath stand is turned on and measurement is started with the viscometer. The viscosity in cP and % torque is recorded upon completion of the measurement.

The measurement steps described above is repeated by inserting the spindle at a different point of the 3% CMC sample solution. The average between the first and second readings is recorded as the final viscosity result. The 3% CMC sample solution is covered with plastic film and placed in a 25° C. temperature controlled environment until further use.

24 hours after the preparation of the 3% CMC sample solution of Example 1, viscosity is measured by repeating the steps described above for one hour after preparation.

Example 3

Comparison of CMC Lots With Known CMC Lots With Unacceptable Viscosity

3% CMC sample solution from CMC lot #50011 (high viscosity) and CMC lot #67109 (low viscosity) were measured for viscosity against 3% CMC sample solution from different CMC lots (#149911 and #146811) using the methods described in Example 2. The results of these measurements is presented in Table 1 below.

TABLE 1

| CMC Lot | Viscosity after 1 hr (cPs) | Viscosity after 24 hrs (cPs) |
|---|---|---|
| CMC Lot # 50011 (high viscosity) | 90,000 | 340,000 |
| CMC Lot # 67109 (low viscosity) | 40,000 | 190,000 |
| CMC Lot # 149911 | 55,000 | 275,000 |
| CMC Lot # 146811 | 60,000 | 260,000 |

Toothpastes prepared with CMC from Lot #50011 and #67109 had unacceptable viscosities especially when compared with toothpastes prepared with CMC from Lot #149911 and Lot #146811, which presented an expected viscosity behavior.

Example 4

Comparison of CMC Lots With Known CMC Lots With Unacceptable Viscosity

4% CMC sample solution from CMC lot #50011 (high viscosity) and CMC lot #67109 (low viscosity) were measured for viscosity against 4% CMC sample solution from different CMC lots (#149911 and #146811) using the methods described in Example 2. The 4% CMC sample solutions were prepared by using the methods described in Example 1 and increasing the amount of CMC sample taken. The results of these measurements is presented in Table 2 below.

TABLE 2

| CMC Lot | Viscosity after 1 hr (cPs) | Viscosity after 24 hrs (cPs) |
|---|---|---|
| CMC Lot # 50011 (high viscosity) | 200,000 | 655,000 |
| CMC Lot # 67109 (low viscosity) | 70,000 | 380,000 |
| CMC Lot # 149911 | 155,000 | 530,000 |
| CMC Lot # 146811 | 165,000 | 555,000 |
| CMC Lot # 189811 | 165,000 | 520,000 |
| CMC Lot # 126011 | 160,000 | 474,000 |
| CMC Lot # 101511 | 180,000 | 530,000 |

Toothpastes prepared with CMC from Lot #50011 and #67109 had unacceptable viscosities for consumer use especially when compared with toothpastes prepared with CMC from Lot #149911, 146811, 189811, 126011 and 101511,

Example 5

Preparation of CMC Sample in Polyethylene Glycol (PEG 600)

A silica based dentifrice was prepared which had the formula outlined in Table 3 below:

TABLE 3

| Ingredient | % w/w |
|---|---|
| SORBITOL 70% Sol | 50.000-85.00 |
| PEG 600 | 0.500-2.000 |
| CMC TMS (carboxymethylcellulose) | 0.500-2.000 |
| SACCHARIN SODIUM | 0.100-0.500 |
| SMFP (sodium monofluorophosphate) | 0.500-1.000 |
| FD & C RED 40 (CI16035) | 0.001-0.010 |
| THICKENER SILICA | 5.000-10.000 |
| AMORPHOUS SILICA | 5.000-10.000 |
| SLS GRANULES (sodium lauryl sulfate) | 1.000-5.000 |
| BETAINE, 30% SOLUTION | 0.500-2.500 |
| FLAVORING | 0.500-2.000 |
| OUTBURST FILM | 0.050-0.250 |
| CP PURIFIED WATER | q.s. |
| TOTAL | 100.000 |

During the manufacturing process of this dentifrice, the carboxymethylcellulose supplied by Supplier #1 resulted in a dentifrice product density of about 13 bku on average initially (bku=British kinetic unit; 1 bku×10,000=cps). The same dentifrice product was made with carboxymethylcellulose supplied by Supplier #2 resulted in a dentifrice product density of 18.55 bku initially (see Table 4 below)

TABLE 4

| | (viscosity of dentifrice in bku) | | | | | | | | |
|---|---|---|---|---|---|---|---|---|---|
| Batch No. of CMC used | Initial | Day 1 | Day 2 | Day 3 | Day 4 | Day 5 | Day 6 | Day 7 | % incr. |
| 6371-206 Supplier #1 | 12.42 | 14.67 | 16.84 | 16.09 | | | | 16.76 | 34.9 |
| 6371-210 Supplier #1 | 13.48 | 15.58 | | | | 19.45 | | 22.97 | 70.4 |
| 6371-208 Supplier #2 | 18.55 | 26.07 | 27.19 | | | | 31.14 | 34.48 | 85.9 |
| % difference between Supplier #1 and Supplier #2 | 49.3 | 77.7 | | | | | | 105.7 | |
| | 37.6 | 67.3 | | | | | | 50.1 | |

As can be seen in Table 4, the gums used in the process of making the dentifrice resulted in vastly different dentifrice properties despite being formed with ostensibly the same compound, i.e. carboxymethylcellulose (CMC). Although, the data shows that viscosity buildup was worse for the Supplier #1 product both initially and over seven days relative to the Supplier #2 product, it would have still been beneficial to see a more immediate indicator that the Supplier #1 lot should not have been used in the formation of the dentifrice.

Various components of the dentifrice were combined with the CMC and the combination of CMC with PEG 600 resulted in a clear distinction between the CMC used.

TABLE 5

(40 wt % CMC in PEG 600)

| | Supplier | | | | | | |
|---|---|---|---|---|---|---|---|
| | Supplier #2 | Supplier #1 | | | | | |
| Lot number | 111015015 | 1210118 | 1210119 | 1210120 | 02 | 03 | 04 |
| Viscosity (cps) | 968 | 400 | 424 | 416 | 464 | 424 | 464 |
| % increase in Supplier #2 product relative to Supplier #1 | | 142 | 128 | 133 | 109 | 128 | 109 |

As can be seen from the data in Table 5, the use of PEG 600 provided an instantaneous distinction between the CMC lots provided by Supplier #2 and Supplier #1.

Similar tests were run for two different suppliers of CMC

TABLE 6

(30 wt % CMC in PEG 600)

| | Supplier | |
|---|---|---|
| | Supplier #3 | Supplier #4 |
| Lot number | AA6275042 | 21991 |
| Viscosity (cps) | 1144 | 1020 |
| % increase in Supplier #3 relative to Supplier #4 | | 12.1 |

As can be seen from the data in Table 6, the viscosities of the different products were within 12.1% of each other which could make them suitable for interchangeable use in the production of a dentifrice product assuming a permissible variance in viscosity of ±25%.

Example 6

Preparation of Carrageenan Sample in Polyethylene Glycol (PEG 600)

The test method from Example 5 as exemplified by the data in Table 5 was repeated except that carrageenan was used as the gum instead of CMC.

TABLE 7

(40 wt % carrageenan in PEG 600)

| | Supplier | | | |
|---|---|---|---|---|
| | FMC | Shemberg | | |
| Lot number | 30110111 | N1013-1 | N1213-3 | N1113-1 |
| Viscosity (cps) | 1496 | 1320 | 1336 | 1952 |
| % increase in Supplier #2 product relative to Supplier #1 | | 13.3 | 12.0 | −23.3 |

As can be seen from the data in Table 6, the viscosities of the different products are suitable for interchangeable use in the production of a dentifrice product assuming a permissible variance in viscosity of ±25%.

As those skilled in the art will appreciate, numerous changes and modifications may be made to the embodiments described herein without departing from the spirit of the invention. It is intended that all such variations fall within the scope of the appended claims.

What is claimed is:

1. A method of determining the viability of a gum for use in making a product which comprises:
   (a) mixing a sample of the gum in a solvent comprising one or more hydroxy moiety containing solvent compounds to form a solution containing the gum;
   (b) measuring the viscosity of the solution and comparing against a predetermined target viscosity for a product;
   (c) comparing the viscosity of the solution and the predetermined target viscosity and discarding gum which is outside the predetermined target viscosity: and
   (d) using the gum which has a viscosity within the predetermined target to prepare a product;
   wherein another hydroxy moiety containing solvent is used if water is used as a solvent.

2. The method of claim 1, wherein concentration of the gum in step (a) is 1-60% by weight, based on the weight of the solution and the gum is selected from the group consisting of modified celluloses, seed galactomannans, microbial polysaccharides, seaweed extracts/sulfated galactans, seaweed extracts/poly(uronic) acid, citrus peel extracts/poly(uronic) acid, exudate gums, starch, agar, collagen, egg whites, furcellaran, gelatin, casein and mixtures thereof.

3. The method of claim 1, wherein the concentration of the gum in step (a) is 2-50% by weight, based on the weight of the solution and the gum is selected from the group consisting of carboxymethylcellulose, methylcellulose, hydroxypropylmethylcellulose, microcrystalline cellulose, guar gum, locust bean gum, xanthan gum, carrageenan, alginates, pectins, gum arabic, starch, agar, collagen, egg whites, furcellaran, gelatin, casein and mixtures thereof.

4. The method of claim 1, wherein the gum is a carboxymethylcellulose or a carrageenan.

5. The method of claim 1, wherein the solvent comprising one or more hydroxy moiety containing solvent compounds is selected from the group consisting of a polyhydric alcohol, a monohydric alcohol, polyethylene glycol, polypropylene glycol, water and mixtures thereof.

6. The method of claim 1, wherein the solvent comprising one or more hydroxy moiety containing solvent compounds is selected from the group consisting of glycol, glycerol (glycerin), propylene glycol, ethylene glycol, erythritol, threitol, arabitol, xylitol, ribitol, mannitol, sorbitol, galactitol, fucitol, iditol, inositol, methanol, ethanol, propanol, butanol, pentanol, stearyl alcohols, a $C_{12}$-$C_{22}$ fatty alcohol, a polyethylene glycol or polypropylene glycol where n is selected from a range consisting of 2-6000, 50-3000, 100-2000, 200-1000, and 400-800 and water.

7. The method of claim 1, wherein the solvent is selected from the group consisting of polyethylene glycol wherein n is 400-800, glycerin, water and mixtures thereof.

8. The method of claim 1, wherein the solvent comprising one or more hydroxy moiety containing solvent compounds is water and a polyhydric alcohol and the ratio of water to polyhydric alcohol is selected from the group of ratios consisting of 2:1 to 1:2 and 4:3 to 3:4.

9. The method of claim 1, wherein the solution has a concentration selected from 10-50 wt. %, 25-45 wt. %, 1-6 wt. %, 2.5-4.5 wt. % and 3-4 wt. % of the gum.

10. The method of claim 1, wherein the predetermined target viscosity is between 50,000 and 200,000 cP after testing a solution containing 1.5-6 wt. % of the gum between 30 minutes and 90 minutes after formation of the solution.

11. The method of claim 1, wherein the predetermined target viscosity is between 100,000 and 200,000 cP after testing a solution containing 4 wt. % of the gum between 50 minutes and 70 minutes after formation of the solution or between 50,000 and 75,000 cP after testing a solution containing 3 wt. % of the gum between 50 minutes and 70 minutes after formation of the solution.

12. The method of claim 1, wherein the predetermined target viscosity is between 225,000 and 600,000 cP after testing a solution containing 1.5-6 wt % of the gum between 18 hours and 30 hours after formation of the solution.

13. The method of claim 1, wherein the predetermined target viscosity is 450,000 and 600,000 cP after testing a solution containing 4 wt. % of the gum between 22 hours and 26 hours after formation of the solution or between 225,000 and 300,000 cP after testing a solution containing 3 wt. % of the gum between 22 hours and 26 hours after formation of the solution.

14. The method of claim 1, wherein the gum is used if the viscosity measurement is within a range selected from the group consisting of: ±35%, ±30 and ±25% of the predetermined target viscosity after the initial measurement.

15. The method of claim 1, wherein the product is selected from the group consisting of an oral care product, a home care product, a personal care product, a pharmaceutical product, a food product, a lubricant product, a paint product, a detergent product, a textile sizing product and a paper product.

16. The method of claim 1, wherein the product is an oral care product which is selected from the group consisting of toothpaste, mouthwash, mouthrinse, dental floss and strips.

17. A method of determining the viability of a thickening or emulsion stabilizer compound for use in making a product which comprises:
(a) mixing a sample of the thickening or emulsion stabilizer compound in a solvent comprising one or more hydroxy moiety containing solvent compounds to form a solution containing the thickening or emulsion stabilizer compound;
(b) measuring the viscosity of the solution and comparing against a predetermined target viscosity for a product;
(c) comparing the viscosity of the solution and the predetermined target viscosity and discarding thickening or emulsion stabilizer compound which is outside the predetermined target viscosity: and
(d) using the thickening or emulsion stabilizer compound which has a viscosity within the predetermined target to prepare a product;
wherein another hydroxy moiety containing solvent is used if water is used as a solvent;
wherein the thickening or emulsion stabilizer compound is first mixed with a polyhydric alcohol to form an intermediate compound/alcohol solution and subsequently, the intermediate compound/alcohol solution is mixed with water to form the solution containing the thickening or emulsion stabilizer compound.

18. A solution consisting of a gum and a solvent comprising one or more hydroxy moiety containing solvent compounds to form a solution containing the gum wherein the solution has a concentration selected from the group consisting of 1-60 wt. %, 2-50 wt. %, 10-50 wt. %, 25-45 wt. %, 1-6 wt. %, 2.5-4.5 wt. %, and 3-4 wt. %, of the gum wherein another hydroxy moiety containing solvent compound is used if water is present;
wherein the gum is selected from the group consisting of modified celluloses, seed galactomannans, microbial polysaccharides, seaweed extracts/sulfated galactans, seaweed extracts/poly(uronic) acid, citrus peel extracts/poly(uronic) acid, exudate gums, starch, agar, collagen, egg whites, furcellaran, gelatin, casein and mixtures thereof; and
the solvent comprising one or more hydroxy moiety containing solvent compounds is selected from the group consisting of a polyhydric alcohol, a monohydric alcohol, polyethylene glycol, polypropylene glycol, water and mixtures thereof.

19. The solution of claim 18, wherein the gum is selected from the group consisting of carboxymethycellulose, methylcellulose, hydroxypropylmethylcellulose, microcrystalline cellulose, guar gum, locust bean gum, xanthan gum, carrageenan, alginates, pectins, gum arabic, starch, agar, collagen, egg whites, furcellaran, gelatin, casein and mixtures thereof, and
the solvent comprising one or more hydroxy moiety containing solvent compounds is selected from the group consisting of glycol, glycerol (glycerin), propylene glycol, ethylene glycol, erythritol, threitol, arabitol, xylitol, ribitol, mannitol, sorbitol, galactitol, fucitol, iditol, inositol, ethanol, propanol, butanol, pentanol, stearyl alcohols, a $C_{12}$-$C_{22}$ fatty alcohol, a polyethylene glycol or polypropylene glycol where n is selected from a range consisting of 2-2000, 10-5000, 20-2000, 200-1000, and 400-800 and water, wherein another hydroxy moiety containing solvent compound is used if water is present.

20. The solution of claim 19, wherein:
(a) the gum is carboxymethylcellulose and the solvent is water and glycerin; or
(b) the gum is carboxymethylcellulose or carrageenan and the solvent is a polyethylene glycol.

* * * * *